(12) United States Patent
Friesen

(10) Patent No.: US 8,011,692 B2
(45) Date of Patent: Sep. 6, 2011

(54) SECURE ACCESSORY AND BALLAST SYSTEM FOR VEHICLES

(75) Inventor: Nolan Friesen, St. Brieux (CA)

(73) Assignee: Bourgault Industries Ltd., St. Brieux, SK (CA)

( * ) Notice: Subject to any disclaimer, the term of this patent is extended or adjusted under 35 U.S.C. 154(b) by 0 days.

(21) Appl. No.: 12/721,764

(22) Filed: Mar. 11, 2010

(65) Prior Publication Data

US 2010/0259060 A1    Oct. 14, 2010

(30) Foreign Application Priority Data

Apr. 8, 2009 (CA) .................................. 2662222

(51) Int. Cl.
*B60R 27/00* (2006.01)
(52) U.S. Cl. .................. 280/759; 296/37.6; 296/39.2
(58) Field of Classification Search .............. 296/37.1, 296/37.6, 39.2, 39.1; 280/759, 757; 224/404; 410/90, 91, 94, 121, 77, 80; 114/121, 122
See application file for complete search history.

(56) References Cited

U.S. PATENT DOCUMENTS

| | | | |
|---|---|---|---|
| 4,902,038 A | 2/1990 | Grover | |
| 4,971,356 A | 11/1990 | Cook | |
| 5,330,227 A | 7/1994 | Anderson | |
| 6,575,679 B2 | 6/2003 | Bourgault et al. | |
| 2004/0119274 A1* | 6/2004 | Carty | 280/759 |
| 2004/0227338 A1* | 11/2004 | Ryan et al. | 280/759 |

* cited by examiner

*Primary Examiner* — Lori L Lyjak
(74) *Attorney, Agent, or Firm* — Frost Brown Todd LLC

(57) ABSTRACT

A system to provide ballast weight and to secure accessories on a vehicle load bed includes a plurality of hollow planks placed on the load bed adjacent to each other with end edges of the planks substantially aligned with each other and with side edges of the planks adjacent to each other such that top surfaces of the planks form a substantially flat load surface. At least one plank includes a filling orifice with a removable cap to allow filling with ballast. Recesses at corners of the planks are configured to form a substantially horizontally oriented lobe on each corner of the planks, and adjacent planks are connected at right and left ends thereof by a clip extending into the corresponding recesses of the adjacent planks, and fastened to the lobes on the adjacent planks. At least one clip is fastened to the load bed.

23 Claims, 11 Drawing Sheets

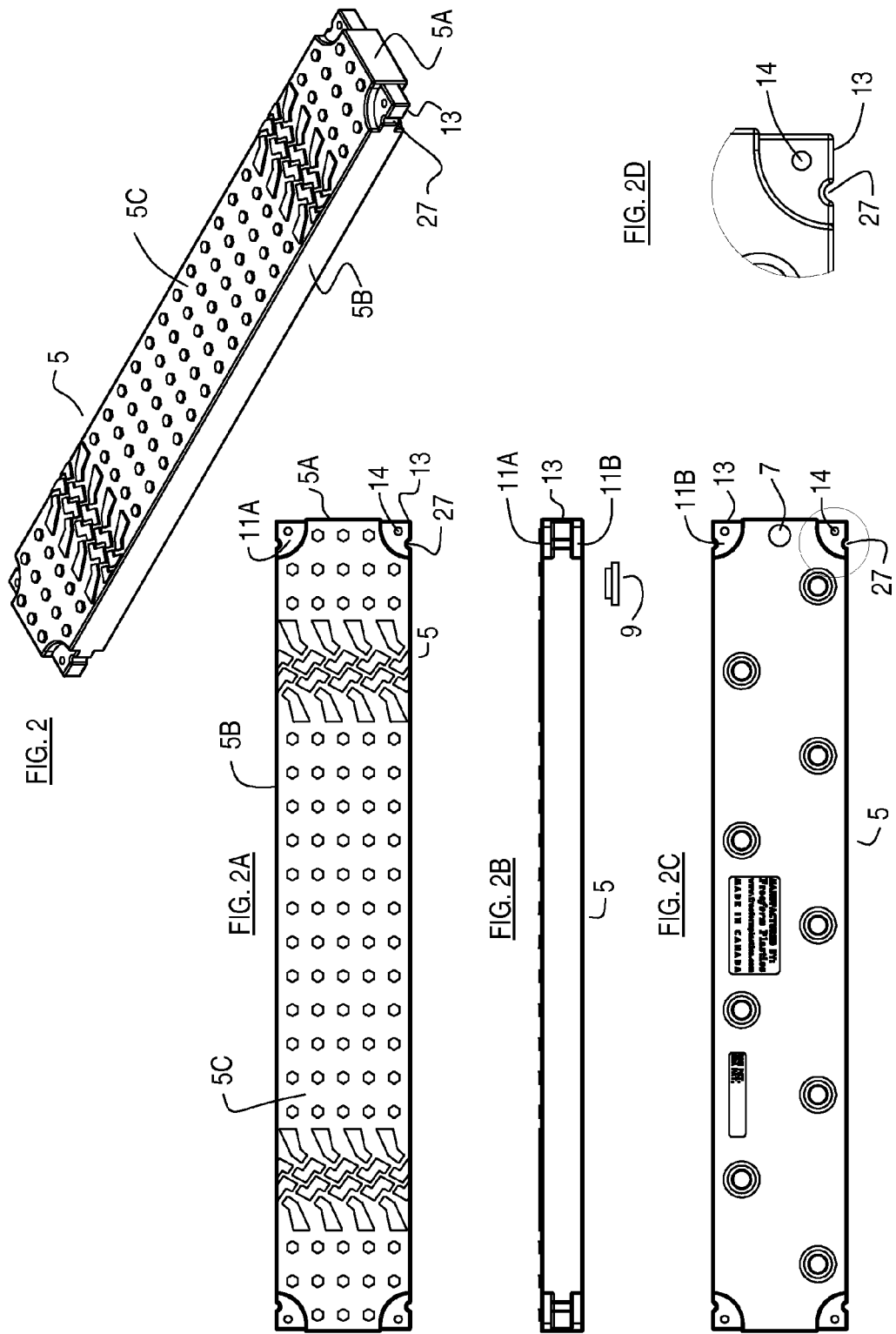

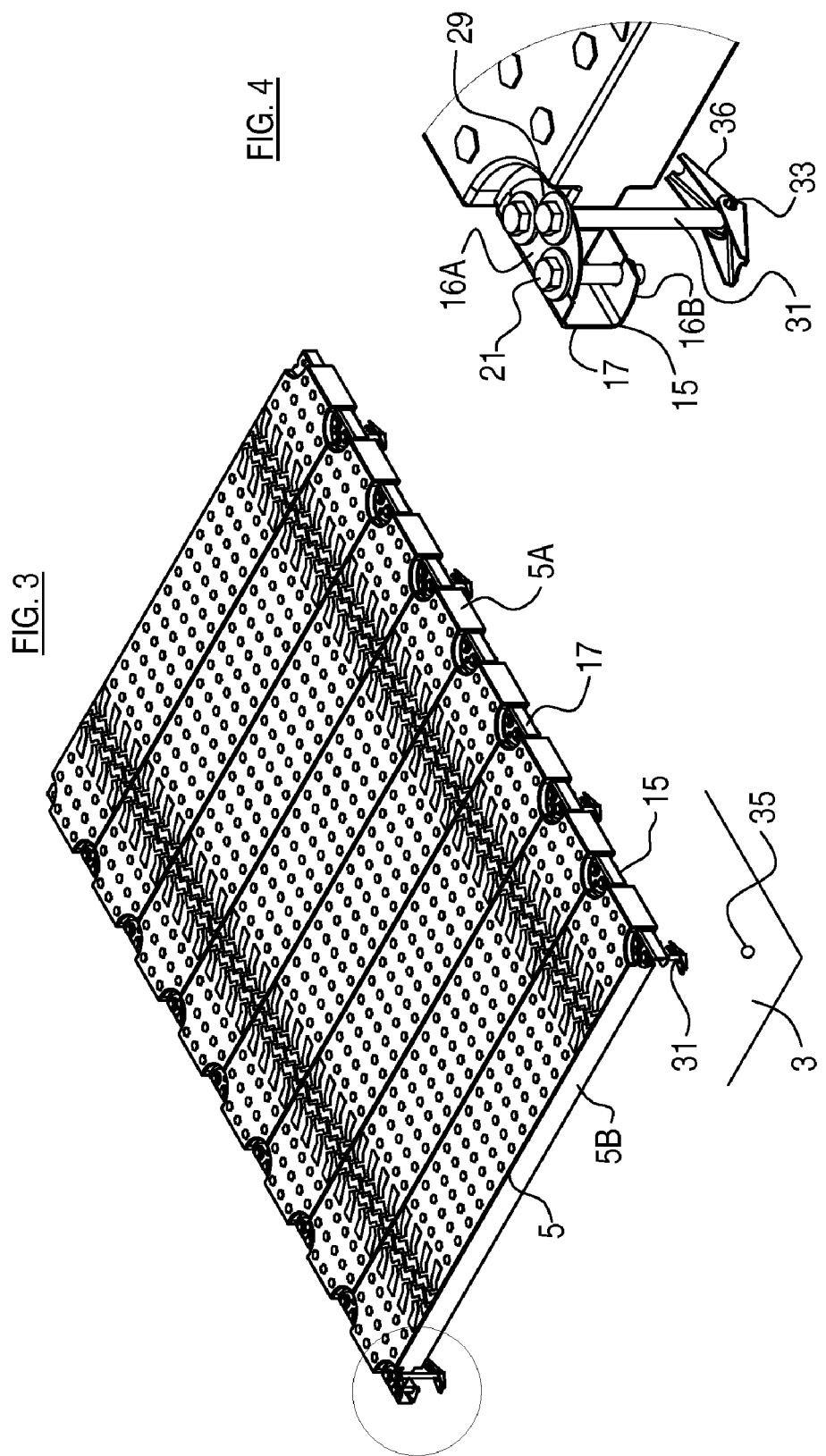

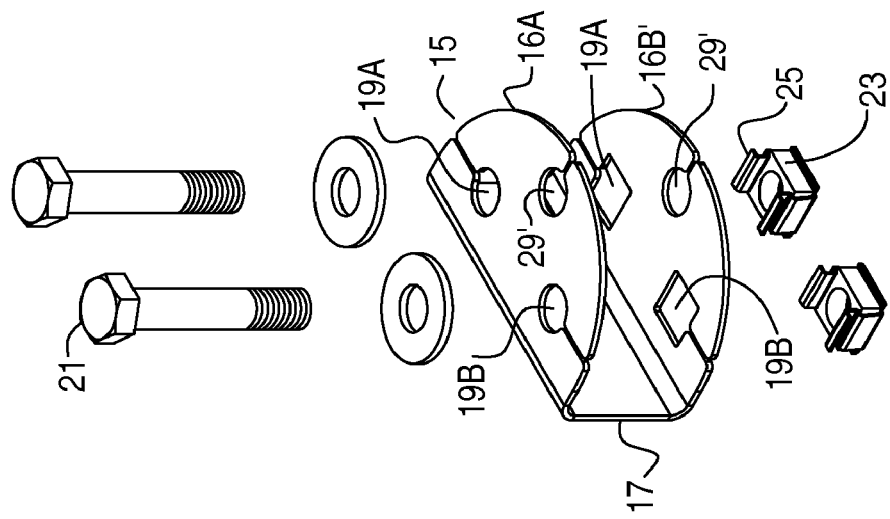

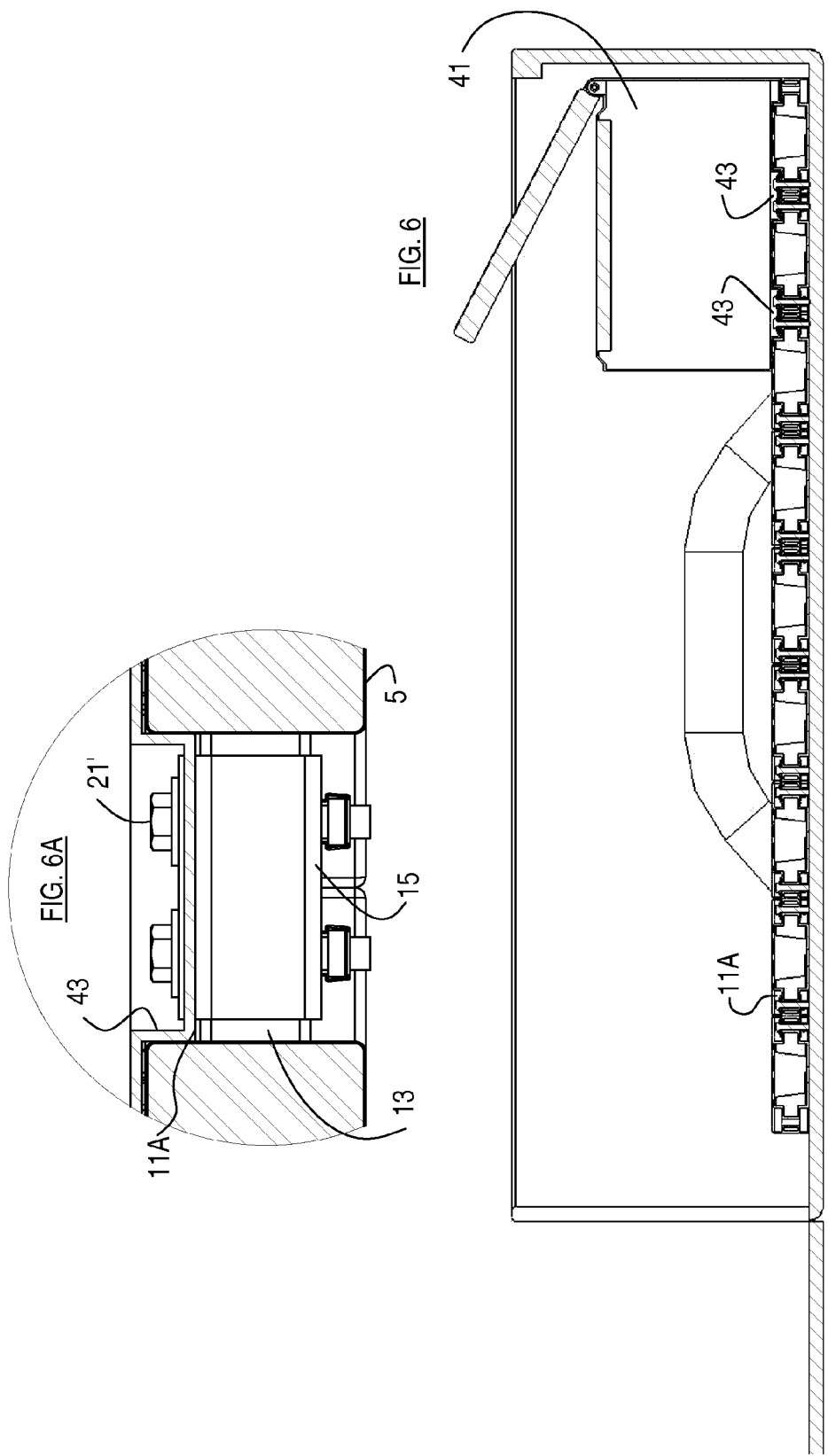

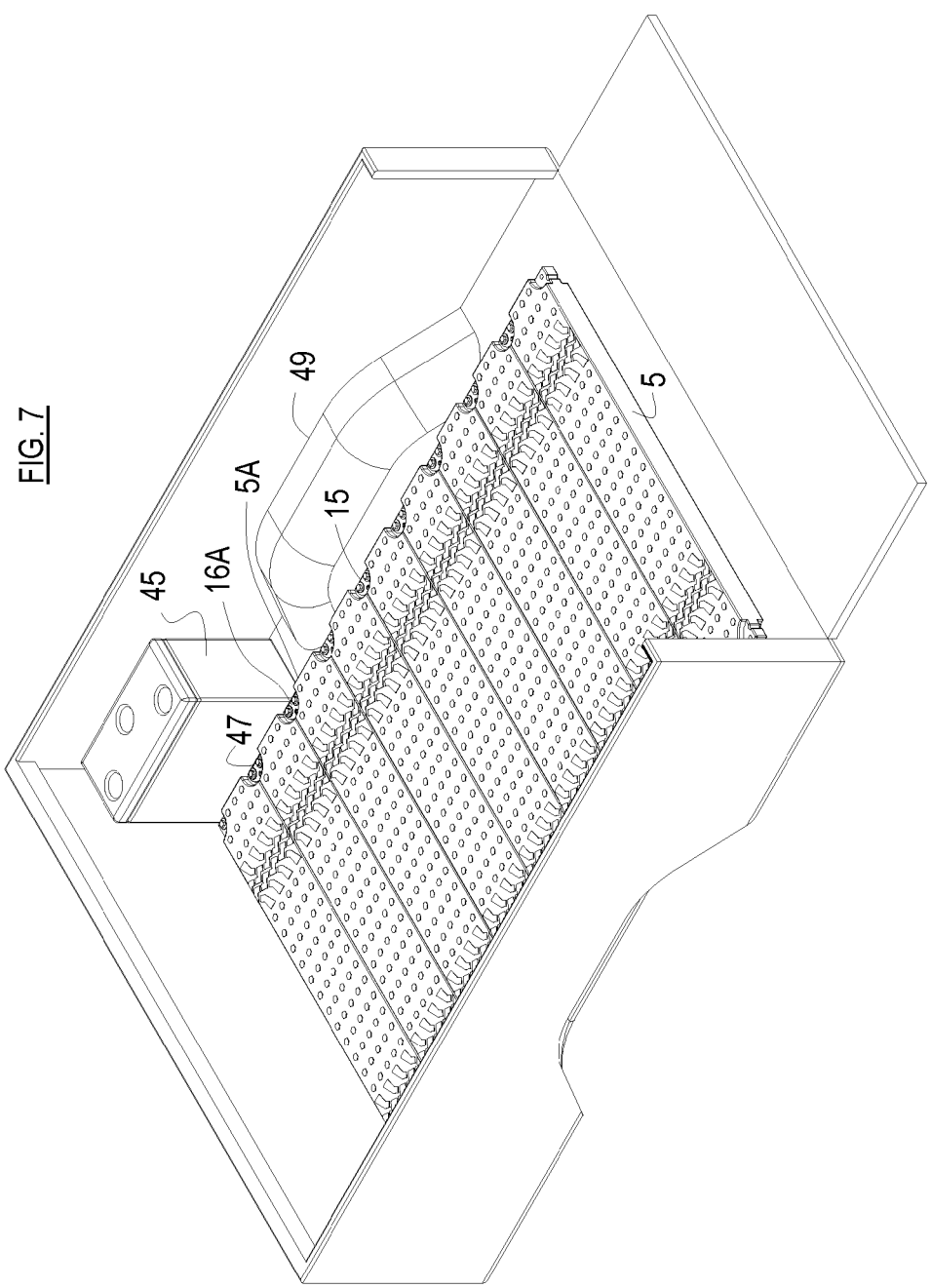

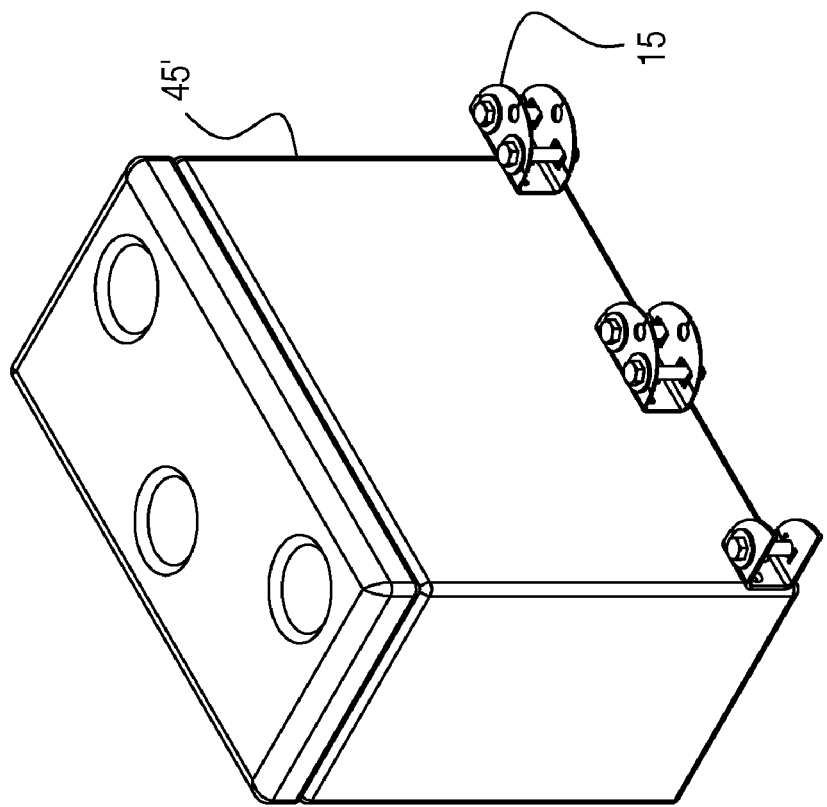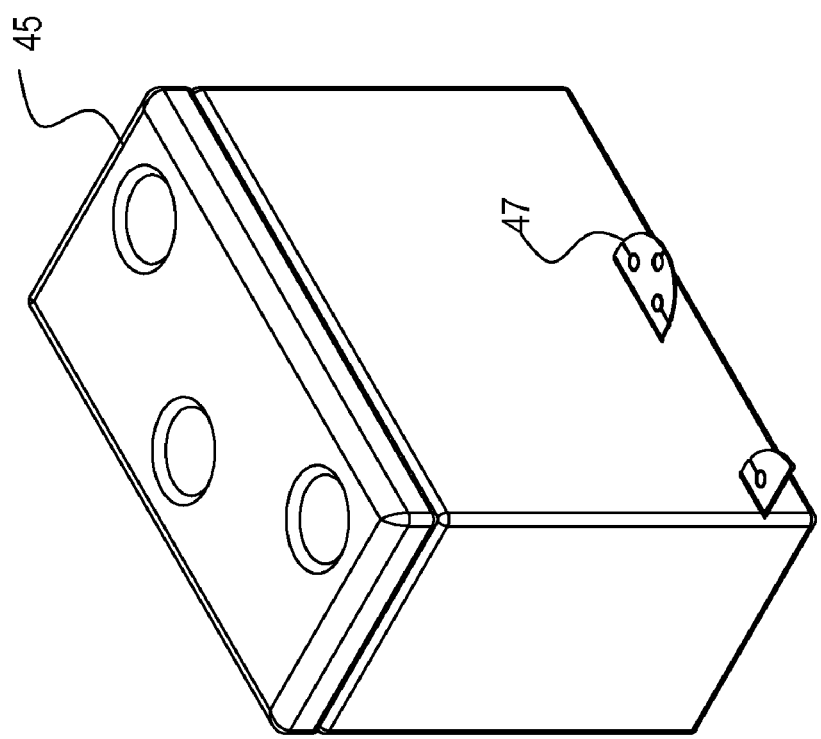

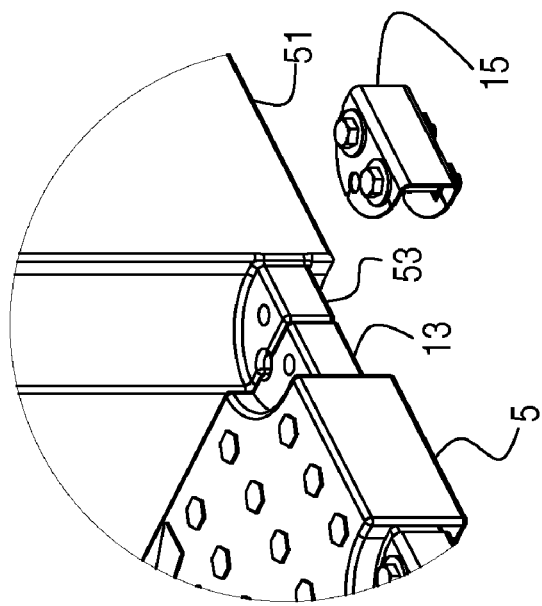
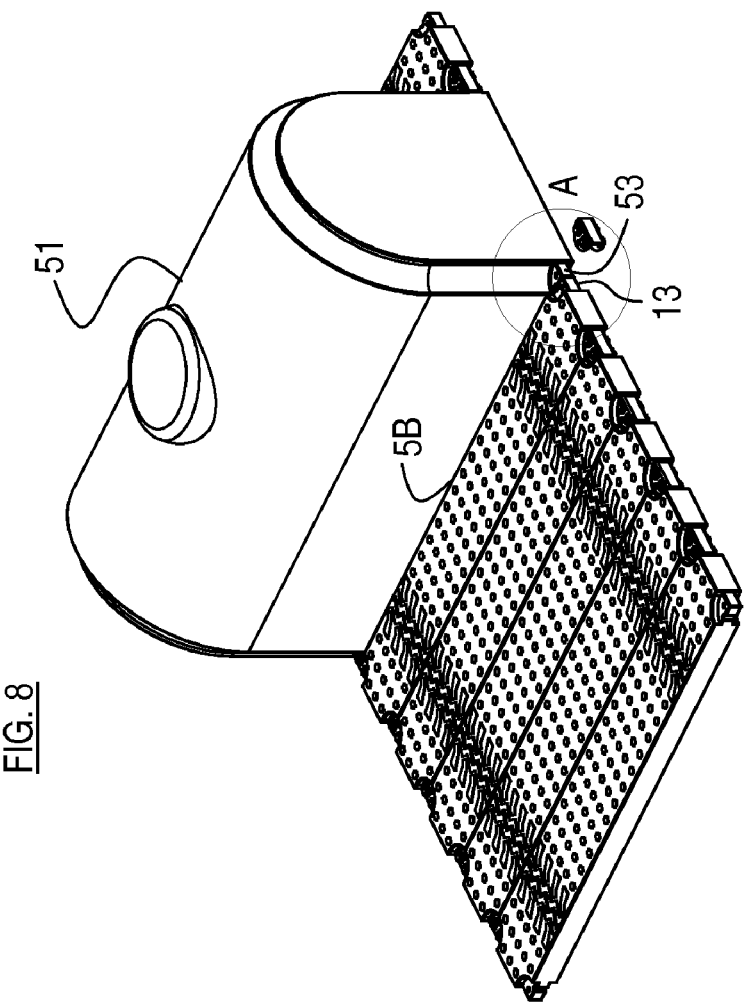

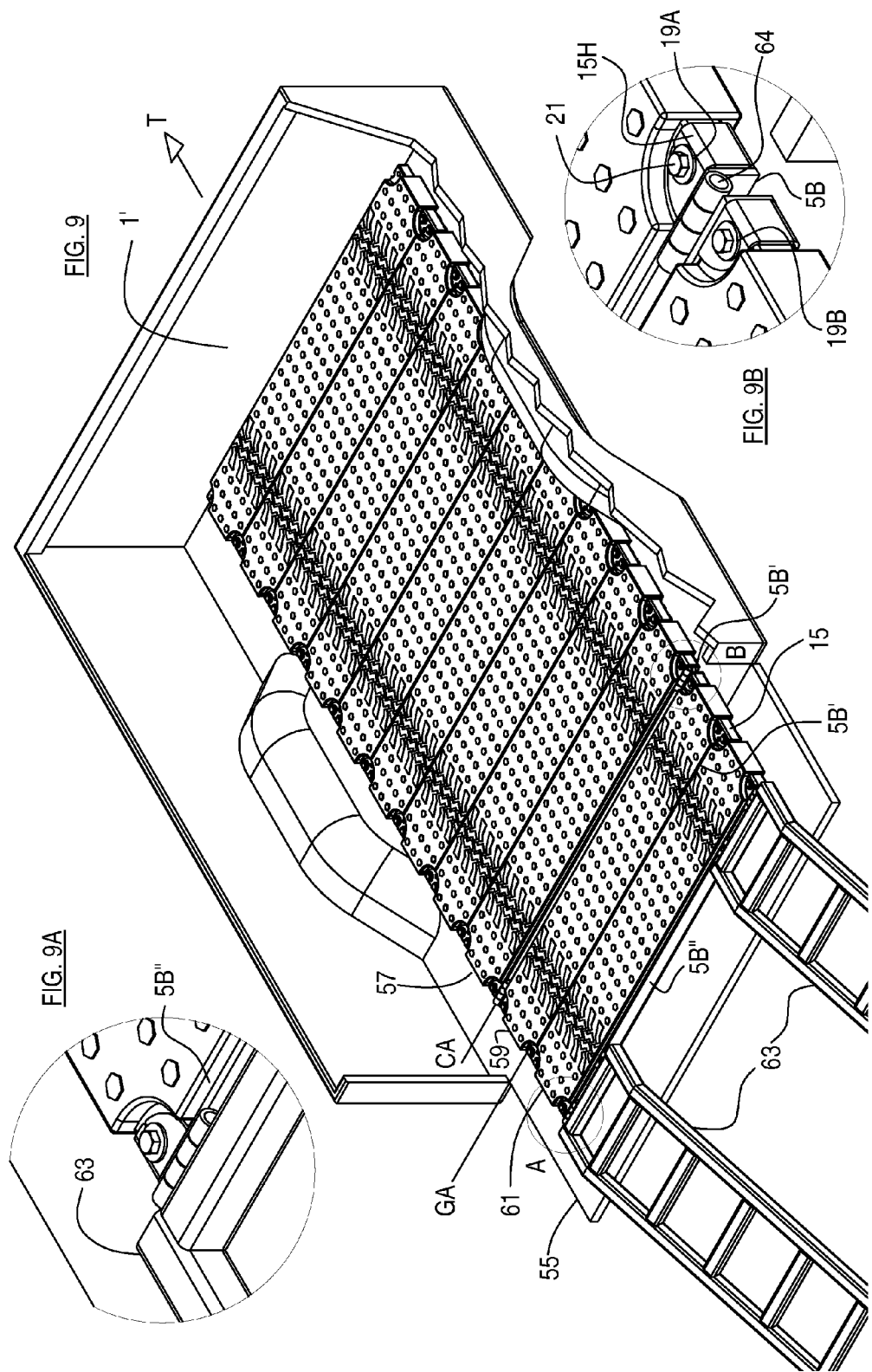

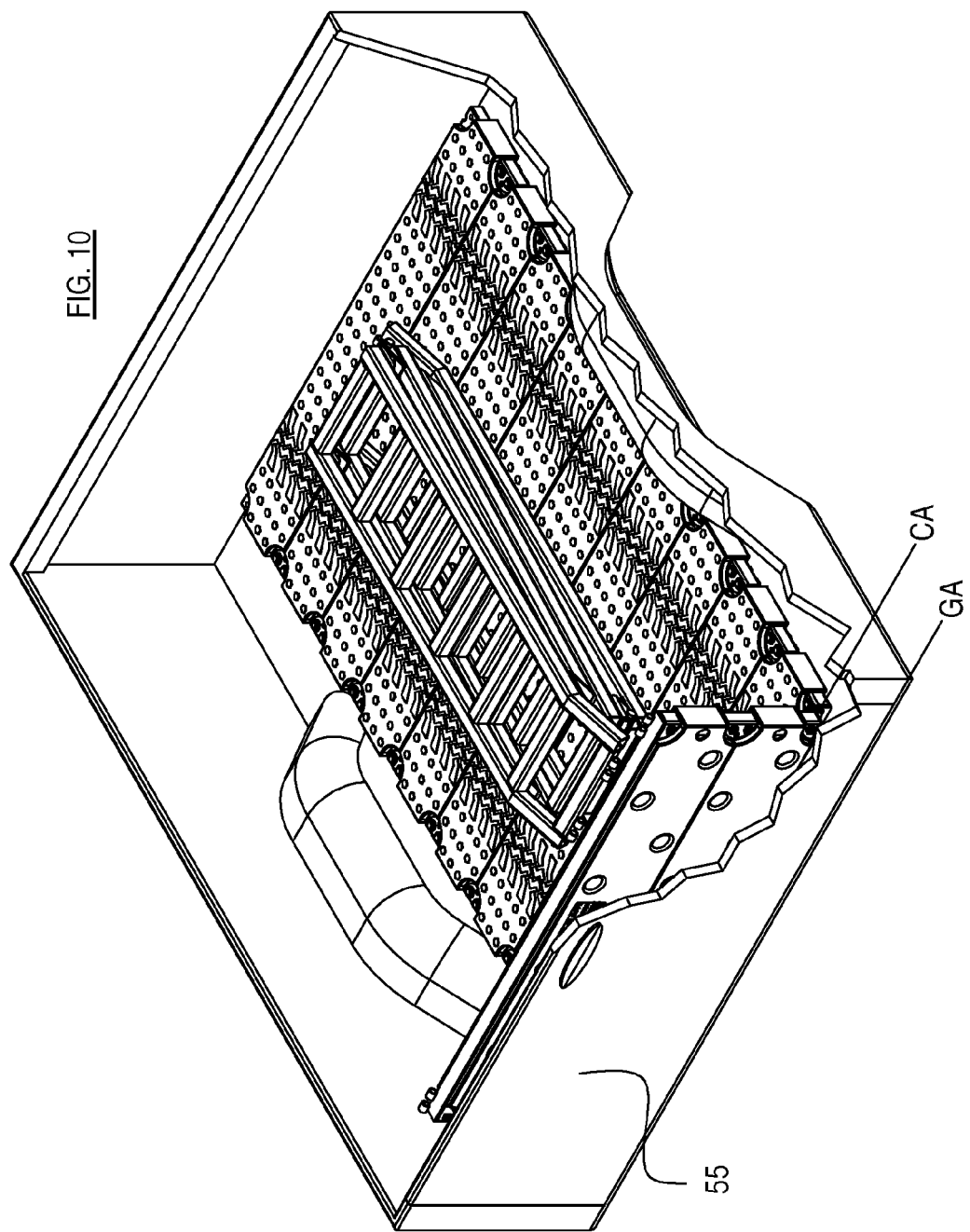

SECURE ACCESSORY AND BALLAST SYSTEM FOR VEHICLES

PRIORITY

This application claims priority to and benefit of Canadian Patent Application Serial No. 2,662,222, filed on Apr. 8, 2009, which is herein incorporated by reference in its entirety.

FIELD

This invention is in the field of vehicles with load beds such as pickup truck boxes, car trunks, sport utility vehicle cargo areas, and the like and in particular a system for providing added ballast weight, such as to increase winter traction, and also to secure articles such as tool boxes, fuel tanks, and the like on the load bed.

BACKGROUND

It is common to carry accessories such as toolboxes and other containers, weights for ballast, and the like on vehicle load bed areas such as truck boxes, van beds, car trunks, etc. These accessories are preferably secured to prevent shifting during travel, and remain in the vehicle for extended periods of time in a semi-permanent fashion. Shifting can damage the article, other contents in the box, or the vehicle itself.

Similarly the purpose of the load bed is to carry a wide array of cargo, and the more permanent accessories such as ballast, toolboxes, and the like often interfere with loading the cargo.

Several prior art patents have been directed to the problem of providing a ballast system for truck boxes that does not shift during travel, and provides minimal interference with loading cargo. See for instance U.S. Pat. No. 4,902,038 to Grover, U.S. Pat. No. 4,971,356 to Cook, and U.S. Pat. No. 5,330,227 to Anderson.

These ballast systems provide a relatively thin layer of weights or ballast elements over substantially the whole floor of the truck box, leaving a relatively unhindered load surface. The volume capacity of the truck box is thus only minimally affected. Canadian Patent No. 2,178,224 to Karrer provides a cargo anchoring system.

U.S. Pat. No. 6,575,679 to Bourgault et al. discloses a system for securing ballast and/or accessories such as toolboxes, tanks, and the like in a truck box. The system has anchor beams fastened to the cargo area and an accessory or ballast member has lips that slide under corresponding lips on the anchor members. The accessory or ballast member can be removed by sliding them rearward out of the truck box; however debris can make it difficult to slide the parts as required.

SUMMARY OF THE INVENTION

It is an object of the present invention to provide a system to provide ballast weight and to secure accessories on a vehicle load bed that overcomes problems in the prior art.

In a first embodiment the present invention provides a system to provide ballast weight and to secure accessories on a vehicle load bed. The system comprises a plurality of hollow planks placed on the load bed adjacent to each other with end edges of the planks substantially aligned with each other and with side edges of the planks adjacent to each other such that top surfaces of the planks form a substantially flat load surface. At least one plank includes a filling orifice with a removable cap. Recesses at corners of the planks are configured to form a substantially horizontally oriented lobe on each corner of the planks, and adjacent planks are connected at right and left ends thereof by a clip extending into the corresponding recesses of the adjacent planks, and fastened to the lobes on the adjacent planks. At least one clip is fastened to the load bed.

In a second embodiment the present invention provides a system to provide ballast weight and to secure accessories on a vehicle load bed. The system comprises a plurality of hollow planks adapted to be placed on the load bed adjacent to each other with end edges of the planks substantially aligned with each other and with a side edge of a first plank adjacent to a side edge of a second plank such that top surfaces of the planks form a substantially flat load surface, wherein the first plank includes a filling orifice with a removable cap. Upper and lower recesses at adjacent corners of the first and second planks are configured to form a substantially horizontally oriented lobe on each plank, the lobe defining a substantially vertical lobe bolt hole through a middle portion thereof, and defining a substantially vertical groove in a side edge thereof, the groove configured such that a first groove in a lobe of the first plank is adjacent to a second groove in a lobe of the second plank such that the first and second grooves form a substantially vertical edge bolt hole. A clip comprises upper and lower clip plates joined by a clip wall, the upper and lower clip plates defining first and second clip bolt holes. The clip is configured such that the upper and lower plates fit into the corresponding upper and lower recesses on the first and second planks with the clip wall substantially aligned with the end edges of the planks, and with the first and second clip bolt holes aligned with the lobe bolt holes in the lobes of the corresponding first and second planks. At least the upper plate of the clip further defining a third clip bolt hole aligned with the edge bolt hole. Lobe fasteners are adapted to extend through the first and second clip bolt holes and lobe bolt holes to fasten the clip to the lobes, and an edge fastener is adapted to extend through the third clip bolt hole and edge bolt hole to fasten the clip to the load bed.

In a third embodiment the present invention provides system to provide ballast weight and to secure accessories on a vehicle load bed. The system comprises a plurality of hollow planks placed on the load bed adjacent to each other with end edges of the planks substantially aligned with each other and with side edges of the planks adjacent to each other such that top surfaces of the planks form a substantially flat load surface, wherein at least one plank includes a filling orifice with a removable cap. Upper and lower recesses at corners of the planks are configured to form a substantially horizontally oriented lobe on each corner of the planks, the lobe defining a substantially vertical lobe bolt hole through a middle portion thereof, and defining a substantially vertical groove in a side edge thereof. The grooves in adjacent lobes at right and left corners of adjacent planks form a substantially vertical edge bolt hole. Adjacent planks are connected at right and left ends thereof by a clip comprising upper and lower clip plates joined by a clip wall, the upper and lower clip plates extending into the corresponding upper and lower recesses of the adjacent planks with the clip wall substantially aligned with the end edges of the planks, the upper and lower plates defining first and second clip bolt holes aligned with the lobe bolt holes in the adjacent lobes. First and second lobe fasteners extend through the corresponding first and second clip bolt holes and the lobe bolt holes in the adjacent lobes to fasten the clip to the lobes. At least the upper plate of the clip further defines a third clip bolt hole aligned with the edge bolt hole formed by the grooves in the adjacent lobes, and an edge fastener extends through the third clip bolt hole and through the edge bolt hole to fasten the clip to the load bed.

The present invention can provide ballast for the vehicle over the drive wheels with minimal interference to the volume capacity of the cargo area. The invention also secures accessories such as tool boxes, tanks, coolers, and the like in a load bed such as a truck box, and can limit shifting of cargo, thereby reducing possible damage.

The system permits the owner to select a multitude of options to make their vehicle more versatile and safe to drive. The accessories that are configurable can include ballast weights, toolboxes, water tanks, fuel tanks, pet kennels, beverage coolers, cargo dividing gates, recreation equipment cases and A TV/snowmobile ramps but not limited to only these accessories. The system allows the user to quickly change out accessories depending on their needs. The accessory system is not limited to trucks but is also useable in cars and sport utility vehicles therefore allowing a user to switch it between vehicles if so desired.

The system provides a level and structurally sound cargo floor only a few inches higher than the original cargo area. They can also have raised features on the top surface to provide a non-slippery surface when walked on. The shallow depth of the planks allows users to benefit from the operation of the system without losing any cargo room.

The system is typically installed by first laying a main plank down at the forward most point on the load bed and securing it to the load bed with clips. This provides a secure mounting point for whichever accessory the user chooses. From here any of the accessories can be attached to the first piece using the supplied connector clips. Some accessories can be used in conjunction with others to form a multifunctional cargo area that makes the vehicle more useful to the user. For example, a user can connect together a set of the planks and then can attach either a cooler or a pet kennel to the top of them using the supplied connector pieces. This allows the cargo area to provide reliable and secure traction over the drive wheels as well as providing a safe and secure transport area for the pet. Accessories can also be attached to the sides of the main plank accessories to add features without taking up the top cargo area of the main planks.

Connector clips attach from the ends of the planks allowing the user to connect and disconnect any piece in the system regardless of its position in the assembly. For example if a user has assembled the system with planks and would like to add a toolbox, they can simply remove planks in the middle of the system, insert the toolbox or tank and reconnect the clips. The accessories are sized to take up the same space as an even plurality of planks. The removed planks can then be stored for use later when more ballast is required or the previously installed accessory is no longer desired for use. The design of the connector clip provides a mounting hole between each main piece to provide securement to the load bed at as many locations as needed depending on the configuration of the vehicle floor. Once all pieces are in place the user has a secure system that will be safe and prevent cargo and accessories from sliding around the cargo area and will reduce or eliminate damage to the cargo and vehicle.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 2 is a perspective view of a plank of the system of FIG. 1;

FIG. 2A is a top view of the plank of FIG. 2

FIG. 2B is a side view of the plank of FIG. 2

FIG. 2C is a bottom view of the plank of FIG. 2

FIG. 2D is a top detail view of a the upper recess forming a lobe on the plank of FIG. 2;

FIG. 3 is a perspective view of the system of FIG. 1 with the load bed removed;

FIG. 4 is a perspective detail view of the connection of the clip to the lobe of the plank of FIG. 2, and a nut with collapsible wings threaded onto the edge fastener for connecting the clip to the load bed;

FIG. 5 is a perspective view of the clip and lobe fasteners of the system of FIG. 1;

FIG. 6 is a schematic cutaway side view of a tool box as illustrated in FIG. 1 fastened to the top of the planks;

FIG. 6A is a schematic cutaway detail view of the feet on the tool box of FIG. 6 fastened to the upper recesses in the top of the planks;

FIG. 7 is a perspective view of a system where a cooler is secured to the load bed adjacent to the ends of the planks;

FIG. 7A is a perspective view of the cooler of FIG. 7 including feet extending from the bottom of the cooler into the upper recesses on the planks;

FIG. 7B is a perspective view of the cooler of FIG. 7 including where the side walls of the cooler are fastened to the clips;

FIG. 8 is a perspective view of a system where a tank rests on the load bed and is secured to the load bed by accessory lobes clipped to the lobes on the planks;

FIG. 8A is a detail perspective view of the lobes and clip of FIG. 8;

FIG. 9 is a perspective view of a system of the invention including a pivoting section that extends over the tailgate of a truck box, and a ramp attached thereto;

FIG. 9A is a detail perspective view of the connection of the ramps;

FIG. 9B is a detail perspective view the hinged clip allowing the rear planks to pivot up with the tailgate;

FIG. 10 shows the system of FIG. 9 with the tailgate up and closed, and the ramps removed, folded, and resting on the planks;

DETAILED DESCRIPTION OF THE ILLUSTRATED EMBODIMENTS

Figure 1:
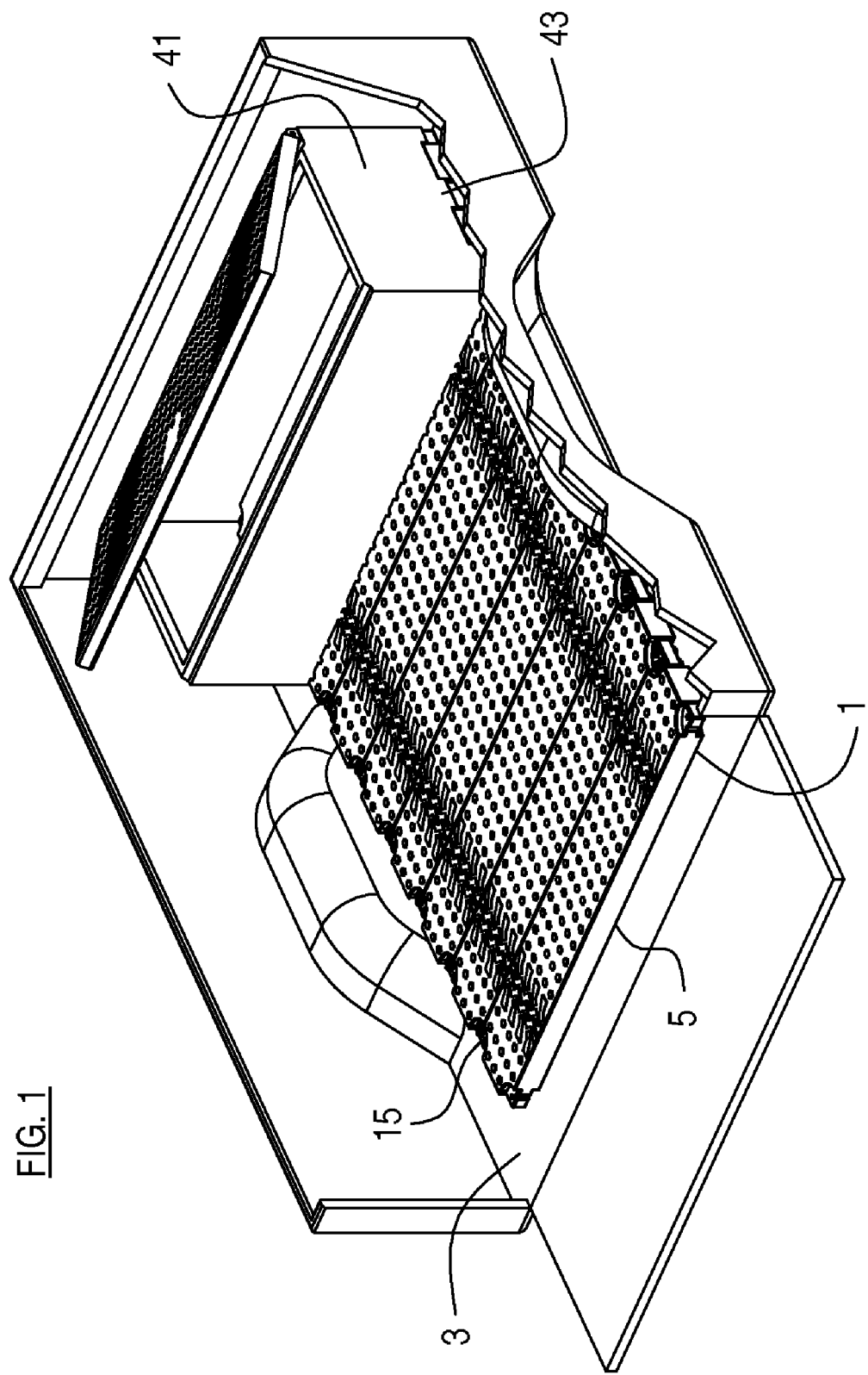
FIG. 1 is a perspective view of an embodiment of a system of the present invention installed on the load bed of a pickup truck, including an optional tool box.

FIGS. 1-5 illustrate the components of an embodiment of a system of the present invention. The system 1 provides ballast weight and secures accessories on a vehicle load bed 3. The illustrated system 1 comprises a plurality of hollow planks 5 placed on the load bed 3 adjacent to each other with end edges 5A of the planks 5 substantially aligned with each other and with side edges 5B of the planks 5 adjacent to each other such that top surfaces 5C of the planks 5 form a substantially flat load surface as illustrated in FIG. 1.

Typically the planks 5 will be formed from a plastic material. To provide ballast when desired, the planks 5 can include a filling orifice 7 as seen in FIG. 2C with a removable cap 9 as shown in FIG. 2B. Sand or the like can be poured into the interior of the hollow plank 5 to add weight.

Upper and lower recesses 11A, 11B at corners of the planks 5 are configured to form a substantially horizontally oriented lobe 13 on each corner of the planks 5. Adjacent planks 5 are connected at right and left ends thereof by a clip 15 extending into the corresponding recesses 11A, 11B of the adjacent planks 5, and fastened to the lobes 13 on the adjacent planks 5.

Each lobe 13 defines a substantially vertical lobe bolt hole 14 through a middle portion thereof, and the clips 15 comprise upper and lower clip plates 16A, 16B joined by a clip wall 17 and extending into the corresponding upper and lower recesses 11A, 11B of the adjacent planks 5 with the clip wall 17 substantially aligned with the end edges 5A of the planks 5.

The upper and lower plates 16A, 16B define first and second clip bolt holes 19A, 19B aligned with the lobe bolt holes 14 in the adjacent lobes 13. Lobe fasteners 21 extend through the first and second clip bolt holes 19A, 19B and the lobe bolt holes 14 in the adjacent lobes 13 to fasten the clip 15 to the lobes 13. In the illustrated embodiment the lobe fasteners 21 comprise bolts threaded into nuts 23 fixed to the bottom plates 16B. As seen in FIG. 5, the nuts 23 can be fixed to the bottom plate 16B by clips 25, or can be welded or otherwise attached so the lobe fasteners can conveniently be inserted and threaded into them from above without the need to have access to the nuts 23.

When the system is assembled, the top ends of the lobe fasteners 21 are located below the top surface 5C of the planks 5, and the bottom ends of the lobe fasteners 21 are located above a bottom surface of the planks 5 so that the lobe fasteners do not interrupt the flat load surface on top surfaces 5C of the planks 5, or the bottom surface of the planks 5 which lie on the load bed 3.

In order to secure the system 1 to the load bed 3, some of the clips 15 are fastened to the load bed 3. In the illustrated planks 5, each lobe 13 defines a substantially vertical groove 27 in a side edge thereof. The groove 27 is configured such that a groove 27 in a lobe 13 of one plank 5 is adjacent to a corresponding groove 27 in the lobe 13 of the adjacent plank 5 such that the grooves 27 form a substantially vertical edge bolt hole.

The clip 15 further defines a third clip bolt hole 29 aligned with the edge bolt hole formed by the grooves 27 in the adjacent lobes 13. An edge fastener 31 extends through the third clip bolt hole 29 and through the edge bolt hole to fasten the clip 15 to the load bed 3, and thereby secure the system 1 to the load bed 3. In FIG. 4, the third clip bolt hole 29 is defined in the upper plate 16A only, while in FIG. 5, the third clip bolt hole 29' is defined in both the upper and lower plates 16A, 16B'.

In FIGS. 3 and 4 the edge fastener 31 is shown as of the type that extends through the load bed 3 and is fastened under the load bed 3. A nut 33 with collapsible wings 36 is threaded onto the edge fastener 31 such that the edge fastener 31 and attached nut 33 can be pushed through the third clip bolt hole 29 and edge bolt hole formed by the grooves 27 and through a bed bolt hole 35 in the load bed 3, schematically shown in FIG. 3, and then the edge fastener 31 can be turned in the nut 33 to tighten the nut 33 and thereby fasten the clip 15 to the load bed 3.

FIG. 1 illustrates an accessory, shown as a tool box 41, secured to the load bed 3 on top of the planks 5. The tool box 41 has a plurality of feet 43 extending from a bottom thereof as schematically illustrated in FIGS. 6 and 6A. The feet 43 are configured such that each foot extends onto an upper recess 11A on a plank 5, or as illustrated into adjoining recesses 11A on adjacent planks 5. An accessory lobe bolt 21' that is somewhat longer than the lobe fastener 21 shown above, extends from the inside of the tool box 41 through each foot 43 and through the clip bolt holes under the foot 43 to secure the tool box 41 to the clip 15 and to secure the clip 15 to the lobes 13 of the adjacent planks 5.

Similarly FIGS. 7-7B illustrate an accessory, illustrated as a cooler 45, 45', that is secured to the load bed 3 adjacent to end edges 5A of the planks 5. The cooler 45, 45' is shown located in front of the wheel well 49 in a typical truck load bed. The cooler 45 illustrated in FIG. 7A includes feet 47 that are essentially flat plates extending laterally outward to engage the upper recesses 16A in the planks 5, with accessory lobe bolts extending down through the feet 47 and through the clip to engage the nuts on the bottom of the clip as described above.

Alternatively FIG. 7B shows the cooler 45' placed at the ends of the planks as in FIG. 7A, but with the clips 15 fastened to side walls of the cooler 45' with screws or the like.

FIGS. 8 and 8A illustrate an accessory illustrated as tank 51 secured to the load bed adjacent to a side edge 5B of a plank 5 such that the tank 51 rests on the load bed adjacent to the plank 5 instead of on top of the plank 5 as with the tool box 41 illustrated in FIGS. 1 and 6. The illustrated tank 51 is shown between two planks 5. The tank 51 includes, as seen in FIG. 8A, an accessory lobe 53 adjacent to a plank lobe 13 on the adjacent plank 5. A clip 15 can then be fastened to the plank lobe 13 and the accessory lobe 53 as described above to secure the tank 51 to the plank 5, and thus to the load bed.

In the system 1' illustrated in FIGS. 9 through 10 a truck box load bed 3 has a tailgate 55 pivotally attached to a rear end of the load bed 3 about a substantially horizontal gate pivot axis GA oriented perpendicular to an operating travel direction T. The system 1' comprises an end plank 57 having a rear side edge 5B located forward of the gate pivot axis GA. Right and left hinged clips 15H attach a pivot plank 59 to the rear side edge 5B of the end plank 57. The hinged clips, as seen in FIG. 9B comprise a clip hinge 64 between the first and second clip bolt holes 19A, 19B, which are indicated but hidden under the lobe fasteners 21, such that rear portions of the hinged clips 15H can pivot with respect to a front portion of the clip 15H about a clip pivot axis CA that is parallel to the gate pivot axis GA.

The rear side edge 5B' of the pivot plank 59 is located rearward of the gate pivot axis GA such that as the tailgate 55 is pivoted upward about the gate pivot axis GA, the pivot plank also pivots up about the clip pivot axis CA as seen in FIG. 10. Another plank, gate plank 61, is clipped to the rear side edge 5B' of the pivot plank 59 as described above by rigid clips 15, and in FIG. 9 ramps 63 are pivotally attached to the rear side edge 5B" of the gate plank 61 as illustrated in FIG. 9A. Thus as illustrated in FIG. 9, when the tailgate 55 is lowered, the pivot and gate planks 59, 61 extend out over the tailgate 55, and the ramps can be attached to the gate plank 61 to allow a vehicle such as an all terrain vehicle, snowmobile, or the like to roll up the ramps 63 and onto the top surfaces 5C of the planks 5. The ramps 63 are then removed and the tailgate 55 can be closed with the pivot and gate planks 59, 61 pivoting up around the clip pivot axis CA as shown in FIG. 10.

Figure 11:
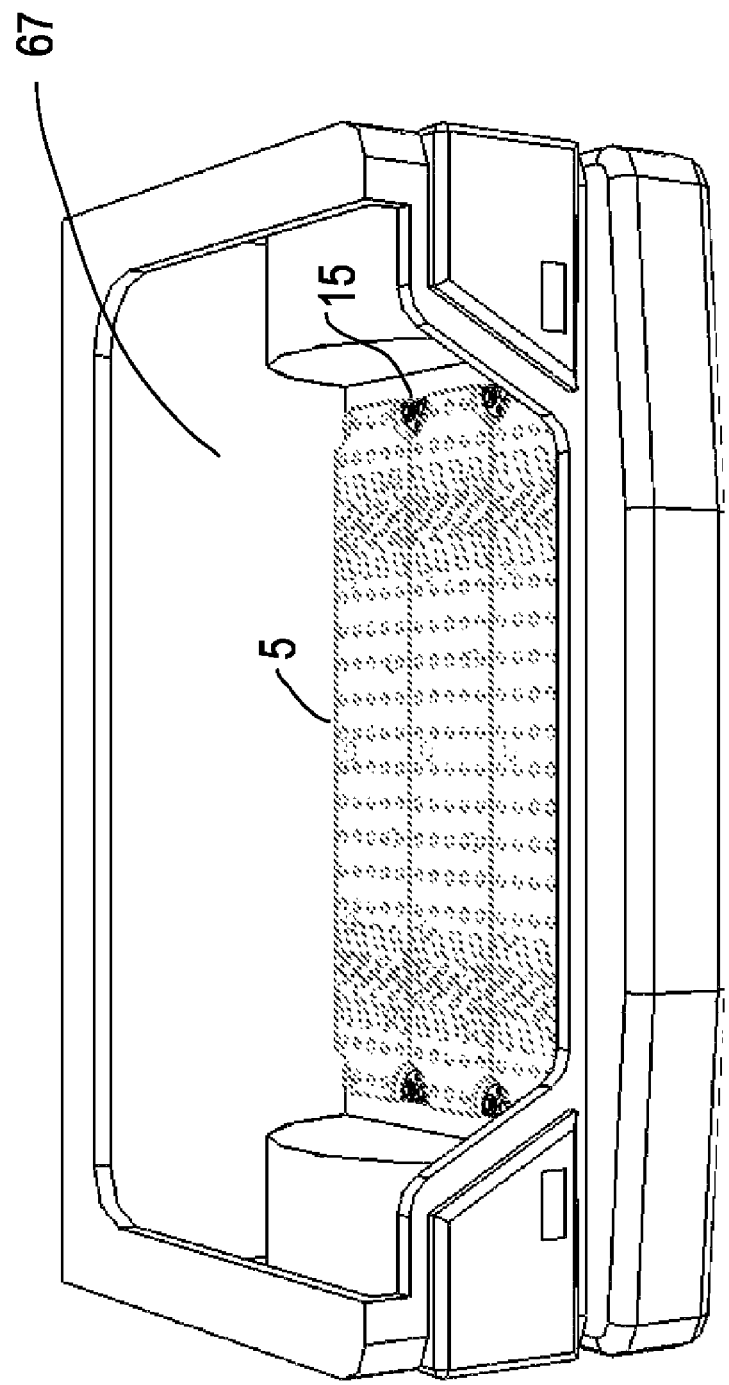
FIG. 11 is a perspective view of a car trunk with a plurality of the planks of FIG. 2 laid on the floor of the trunk.

FIG. 11 shows a plurality of planks 5 joined by clips 15 laid on the floor of a car trunk 67 to add weight to the car. It is contemplated that further accessories could be provided as well, such as dividers to provide small compartments to limit shifting of cargo.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A system to provide ballast weight and to secure accessories on a vehicle load bed, the system comprising:
    a plurality of hollow planks placed on the load bed adjacent to each other with end edges of the planks substantially aligned with each other and with side edges of the planks adjacent to each other such that top surfaces of the planks form a substantially flat load surface;
    wherein at least one plank includes a filling orifice with a removable cap;
    recesses at corners of the planks configured to form a substantially horizontally oriented lobe on each corner of the planks;
    wherein adjacent planks are connected at right and left ends thereof by a clip extending into the corresponding recesses of the adjacent planks, and fastened to the lobes on the adjacent planks; and
    wherein at least one clip is fastened to the load bed.

2. The system of claim 1 wherein the recesses at the corners of the planks comprise upper and lower recesses, and wherein each lobe defines a substantially vertical lobe bolt hole through a middle portion thereof, and wherein the clip comprises upper and lower clip plates joined by a clip wall and extending into the corresponding upper and lower recesses of the adjacent planks with the clip wall substantially aligned with the end edges of the planks, the upper and lower plates defining first and second clip bolt holes aligned with the lobe bolt holes in the adjacent lobes, and first and second lobe fasteners extending through the corresponding first and second clip bolt holes and the lobe bolt holes in the adjacent lobes to fasten the clip to the lobes.

3. The system of claim 2 wherein top ends of the lobe fasteners are located below a top surface of the planks, and wherein bottom ends of the lobe fasteners are located above a bottom surface of the planks.

4. The system of claim 3 wherein the lobe fasteners comprise bolts threaded into nuts fixed to the bottom plates.

5. The system of claim 2 wherein each lobe defines a substantially vertical groove in a side edge thereof, the groove configured such that a first groove in a lobe of the first plank is adjacent to a second groove in a lobe of the second plank such that the first and second grooves form a substantially vertical edge bolt hole, and wherein the at least one clip further defines a third clip bolt hole aligned with the edge bolt hole formed by the grooves in the adjacent lobes, and wherein an edge fastener extends through the third clip bolt hole and through the edge bolt hole to fasten the clip to the load bed.

6. The system of claim 5 wherein the edge fastener extends through the load bed and is fastened under the load bed.

7. The system of claim 6 comprising a nut with collapsible wings threaded onto the edge fastener such that the edge fastener and attached nut can be pushed through the third clip bolt hole and edge bolt hole and through a bed bolt hole in the load bed and then the edge fastener can be turned in the nut to tighten the nut and thereby fasten the clip to the load bed.

8. The system of claim 2 further comprising an accessory secured to the load bed, the accessory comprising a plurality of feet extending from a bottom thereof and configured such that each foot extends onto an upper recess on a plank, and
    wherein a lobe bolt extends through each foot and through a clip bolt hole under the foot.

9. The system of claim 8 wherein the accessory is located on top of the planks or adjacent to ends of the planks.

10. The system of claim 2 further comprising an accessory secured to the load bed adjacent to a side edge of a plank, the accessory comprising an accessory lobe adjacent to a plank lobe on the adjacent plank, and wherein a clip is fastened to the plank lobe and the accessory lobe.

11. The system of claim 8 wherein the accessory comprises one of a tank, a tool box, and a cooler.

12. The system of claim 2 wherein the load bed comprises a truck box load bed with a tailgate pivotally attached to a rear end of the load bed about a substantially horizontal gate pivot axis oriented perpendicular to an operating travel direction and comprising:
    an end plank having a rear side edge located forward of the gate pivot axis;
    right and left hinged clips attaching a pivot plank to the rear side edge of the end plank, wherein the hinged clips comprise a clip hinge between the first and second clip bolt holes such that rear portions of the hinged clips can pivot with respect to a front portion of the clip about a clip pivot axis that is parallel to the gate pivot wherein a rear side edge of the pivot plank is located rearward of the gate pivot axis.

13. The system of claim 12 comprising at least one gate plank attached to the pivot plank, and a ramp pivotally attached to a rear side edge of the at least one gate plank.

14. A system to provide ballast weight and to secure accessories on a vehicle load bed, the system comprising:
    a plurality of hollow planks adapted to be placed on the load bed adjacent to each other with end edges of the planks substantially aligned with each other and with a side edge of a first plank adjacent to a side edge of a second plank such that top surfaces of the planks form a substantially flat load surface;
    wherein the first plank includes a filling orifice with a removable cap;
    upper and lower recesses at adjacent corners of the first and second planks configured to form a substantially horizontally oriented lobe on each plank, the lobe defining a substantially vertical lobe bolt hole through a middle portion thereof, and defining a substantially vertical groove in a side edge thereof, the groove configured such that a first groove in a lobe of the first plank is adjacent to a second groove in a lobe of the second plank such that the first and second grooves form a substantially vertical edge bolt hole; and
    a clip comprising upper and lower clip plates joined by a clip wall, the upper and lower clip plates defining first and second clip bolt holes, the clip configured such that the upper and lower plates fit into the corresponding upper and lower recesses on the first and second planks with the clip wall substantially aligned with the end edges of the planks, and with the first and second clip bolt holes aligned with the lobe bolt holes in the lobes of the corresponding first and second planks;
    at least the upper plate of the clip further defining a third clip bolt hole aligned with the edge bolt hole; and
    lobe fasteners adapted to extend through the first and second clip bolt holes and lobe bolt holes to fasten the clip to the lobes, and an edge fastener adapted to extend through the third clip bolt hole and edge bolt hole to fasten the clip to the load bed.

15. The system of claim 14 wherein top ends of the lobe fasteners are located below a top surface of the planks, and wherein bottom ends of the lobe fasteners are located above a bottom surface of the planks.

16. The system of claim 15 wherein the lobe fasteners comprise bolts threaded into nuts fixed to the bottom plates.

17. The system of claim 14 wherein the edge fastener extends through the load bed and is fastened under the load bed.

18. The system of claim 14 further comprising an accessory adapted to be secured to the load bed at a location that is one of on top of the planks and adjacent to ends of the planks, the accessory comprising at least one foot extending from a bottom thereof and configured such that the foot can extend into an upper recess on a plank, and such that a lobe bolt can be inserted through the foot and through a clip under the foot.

19. The system of claim 14 further comprising an accessory adapted to be secured to the load bed adjacent to a side edge of a plank, the accessory comprising an accessory lobe configured to be located adjacent to a plank lobe on the adjacent plank, such that a clip can be fastened to the plank lobe and the accessory lobe with lobe bolts.

20. The system of claim 18 wherein the accessory comprises one of a tank, a tool box, and a cooler.

21. A system to provide ballast weight and to secure accessories on a vehicle load bed, the system comprising:
- a plurality of hollow planks placed on the load bed adjacent to each other with end edges of the planks substantially aligned with each other and with side edges of the planks adjacent to each other such that top surfaces of the planks form a substantially flat load surface;
- wherein at least one plank includes a filling orifice with a removable cap;
- upper and lower recesses at corners of the planks configured to form a substantially horizontally oriented lobe on each corner of the planks, the lobe defining a substantially vertical lobe bolt hole through a middle portion thereof, and defining a substantially vertical groove in a side edge thereof;
- wherein the grooves in adjacent lobes at right and left corners of adjacent planks form a substantially vertical edge bolt hole;
- wherein adjacent planks are connected at right and left ends thereof by a clip comprising upper and lower clip plates joined by a clip wall, the upper and lower clip plates extending into the corresponding upper and lower recesses of the adjacent planks with the clip wall substantially aligned with the end edges of the planks, the upper and lower plates defining first and second clip bolt holes aligned with the lobe bolt holes in the adjacent lobes;
- first and second lobe fasteners extending through the corresponding first and second clip bolt holes and the lobe bolt holes in the adjacent lobes to fasten the clip to the lobes;
- wherein at least the upper plate of the clip further defines a third clip bolt hole aligned with the edge bolt hole formed by the grooves in the adjacent lobes, and
- wherein an edge fastener extends through the third clip bolt hole and through the edge bolt hole to fasten the clip to the load bed.

22. The system of claim 21 further comprising an accessory secured to the load bed, the accessory comprising a plurality of feet extending from a bottom thereof and configured such that each foot extends onto an upper recess on a plank, and wherein a lobe bolt extends through each foot and through a clip bolt hole under the foot.

23. The system of claim 21 further comprising an accessory secured to the load bed adjacent to a side edge of a plank, the accessory comprising an accessory lobe located adjacent to a plank lobe on the adjacent plank, and wherein a clip is fastened to the plank lobe and the accessory lobe.

* * * * *